(12) United States Patent
Korud et al.

(10) Patent No.: US 12,001,873 B2
(45) Date of Patent: Jun. 4, 2024

(54) CABLE COMMUNICATION SYSTEM USING VIRTUAL NETWORK FUNCTIONS

(71) Applicant: FALCON V SYSTEMS SA, Gdynia (PL)

(72) Inventors: Andriy Korud, Gdynia (PL); Tadeusz Ciesielski, Gdynia (PL)

(73) Assignee: FALCON V SYSTEMS SA, Gdynia (PL)

( * ) Notice: Subject to any disclaimer, the term of this patent is extended or adjusted under 35 U.S.C. 154(b) by 565 days.

(21) Appl. No.: 17/359,573

(22) Filed: Jun. 27, 2021

(65) Prior Publication Data

US 2022/0405113 A1     Dec. 22, 2022

(30) Foreign Application Priority Data

Jun. 17, 2021 (PL) .......................................... 438185

(51) Int. Cl.
*G06F 9/44*       (2018.01)
*G06F 9/455*      (2018.01)
*H04L 41/0803*    (2022.01)
*H04L 47/10*      (2022.01)

(52) U.S. Cl.
CPC ...... *G06F 9/45558* (2013.01); *H04L 41/0803* (2013.01); *H04L 47/10* (2013.01); *G06F 2009/45595* (2013.01)

(58) Field of Classification Search
CPC .................................................. G06F 9/45558
USPC ......................................................... 718/1
See application file for complete search history.

(56) References Cited

U.S. PATENT DOCUMENTS

| | | | |
|---|---|---|---|
| 9,686,198 B1 | 6/2017 | Smith et al. | |
| 10,020,962 B2 | 7/2018 | Patrick et al. | |
| 10,089,123 B2* | 10/2018 | Bernstein | H04L 12/2801 |
| 10,616,126 B2 | 4/2020 | Patrick et al. | |
| 10,802,856 B1 | 10/2020 | Matatyaou et al. | |
| 2016/0359675 A1* | 12/2016 | Chen | H04L 43/08 |
| 2018/0014081 A1 | 1/2018 | Levy et al. | |
| 2020/0396673 A1* | 12/2020 | Tiwari | H04W 76/27 |

OTHER PUBLICATIONS

ETSI GS NFV-MAN 001, "Network Functions Visualization (NFV); Management and Orchestration", version 1.1.1, section 5.6.4, pp. 1-184, Dec. 2014.

(Continued)

*Primary Examiner* — Timothy A Mudrick
(74) *Attorney, Agent, or Firm* — Kligler & Associates Patent Attorneys Ltd.

(57) ABSTRACT

A cable communication system includes one or more data-plane virtual network functions (VNFs) and one or more control-plane VNFs. The data-plane VNFs are configured to run on one or more hosts in a data network, and to perform data-plane medium access control (MAC) processing for a plurality of user-side cable modems and for a plurality of network-side physical-layer (PHY) devices that communicate with the user-side modems. The control-plane VNFs are configured to run on at least one host in the data network, separately from the data-plane VNFs, and to perform control-plane processing for the user-side modems and the network-side PHY devices.

18 Claims, 4 Drawing Sheets

(56) References Cited

OTHER PUBLICATIONS

Cable Television Laboratories, Inc, "Data-Over-Cable Service Interface Specifications; Flexible MAC Architecture—Flexible MAC Architecture MAC Manager Interface Specification", CM-SP-FMA-MMI-I01-200930, pp. 1-22, Sep. 30, 2020.

Cable Television Laboratories, Inc, "Data-Over-Cable Service Interface Specifications—DOCSIS® 4.0—MAC and Upper Layer Protocols Interface Specification," CM-SP-MULPIv4.0-I03-201202, pp. 1-993, Dec. 2, 2020.

Cable Television Laboratories, Inc, "Data-Over-Cable Service Interface Specifications—MHAv2—Remote PHY Specification," CM-SP-R-PHY-I15-201207, pp. 1-463, Dec. 7, 2020.

Cable Television Laboratories, Inc, "Data-Over-Cable Service Interface Specifications—MHAv2—Remote Downstream External PHY Interface Specification," CM-SP-R-DEPI-I15-201207, pp. 1-113, Dec. 7, 2020.

Cable Television Laboratories, Inc, "Data-Over-Cable Service Interface Specifications—MHAv2—Remote Upstream External PHY Interface Specification," CM-SP-R-UEPI-I13-201207, pp. 1-57, Dec. 7, 2020.

Cable Television Laboratories, Inc, "Data-Over-Cable Service Interface Specifications—DCA—MHAv2—Remote PHY Specification", CM-SP-R-PHY-I06-170111, pp. 1-213, Nov. 1, 2017.

Cable Television Laboratories, Inc, "Data-Over-Cable Service Interface Specifications DCA—MHAv2—Remote DOCSIS Timing Interface", CM-SP-R-DTI-I08-200323, pp. 1-44, Mar. 23, 2020.

IO Visor, "XDP express Data Path—Introduction to XDP", pp. 1-4, year 2016.

Wikipedia, "Express Data Path," pp. 1-2, last edited Sep. 19, 2020.

\* cited by examiner

CABLE COMMUNICATION SYSTEM USING VIRTUAL NETWORK FUNCTIONS

CROSS-REFERENCE TO RELATED APPLICATIONS

This application claims priority from Polish Patent Application P.438185, filed Jun. 17, 2021, whose disclosure is incorporated herein by reference.

FIELD OF THE INVENTION

The present invention relates generally to cable communication, and particularly to methods and systems for cable communication using Virtual Network Functions (VNFs).

BACKGROUND OF THE INVENTION

A typical cable communication access network comprises a central unit ("headend") that is connected to multiple Cable Modems (CMs) by a Hybrid Fiber Coax (HFC) network. In Data over Cable Service Interface Specification (DOCSIS) networks, for example, the central unit is referred to as a Cable Modem Termination System (CMTS) or Converged Cable Access Platform (CCAP). A legacy CMTS typically comprises dedicated hardware that runs dedicated software, the latter typically being referred to as iCMTS.

A more recent DOCSIS access-network architecture is referred to as Modular Headend Architecture (MHA, e.g., MHAv2) or Distributed Access Architecture (DAA). This architecture makes use of Remote Physical layer (PHY) Devices (RPD) and a separate Medium Access Control (MAC) layer function. The MAC layer in MHAv2 may be implemented on general purpose computing hosts in software, such implementation being referred to as vCMTS.

SUMMARY OF THE INVENTION

An embodiment of the present invention that is described herein provides a cable communication system including one or more data-plane virtual network functions (VNFs) and one or more control-plane VNFs. The data-plane VNFs are configured to run on one or more hosts in a data network, and to perform data-plane medium access control (MAC) processing for a plurality of user-side cable modems and for a plurality of network-side physical-layer (PHY) devices that communicate with the user-side modems. The control-plane VNFs are configured to run on at least one host in the data network, separately from the data-plane VNFs, and to perform control-plane processing for the user-side modems and the network-side PHY devices.

In some embodiments, the data-plane VNFs are configured to run on one or more hosts having a first range of network latency via the data network from the user-side cable modems, and the control-plane VNFs are configured to run on at least one host having a second range of network latency via the data network, larger than the first range, from the user-side cable modems.

In a disclosed embodiment, the control-plane VNFs include at least one fast-control-plane VNF configured to schedule upstream transmissions from the user-side cable modems to the network-side PHY devices, and at least one slow-control-plane VNF configured to configure (i) the user-side cable modems and (ii) network-side and user-side Radio-Frequency (RF) elements. In an example embodiment, the fast-control-plane VNFs are configured to run on one or more first hosts, and the slow-control-plane VNFs are configured to run on one or more second hosts, such that the first hosts have a smaller network latency from the user-side cable modems, in comparison with the second hosts.

In a disclosed embodiment, at least a given host, which runs at least a given VNF among the data-plane VNFs and the control-plane VNFs, includes an accelerator configured to offload at least part of the given VNF from a CPU of the given host.

In some embodiments, the system further includes at least one orchestration VNF, which is configured to control operation of the data-plane VNFs and the control-plane VNFs. In an embodiment, the orchestration VNF is configured to migrate a given VNF from a first physical host to a second physical host.

In an embodiment, the data-plane VNFs and the control-plane VNFs are implemented as application containers.

There is additionally provided, in accordance with an embodiment of the present invention, a method for cable communication including performing data-plane medium access control (MAC) processing, for a plurality of user-side cable modems and for a plurality of network-side physical-layer (PHY) devices that communicate with the user-side modems, by running one or more data-plane virtual network functions (VNFs) on one or more hosts in a data network. Control-plane MAC processing is performed for the user-side modems and the network-side PHY devices, by running one or more control-plane VNFs on at least one host in the data network, separately from the data-plane VNFs.

The present invention will be more fully understood from the following detailed description of the embodiments thereof, taken together with the drawings in which:

DETAILED DESCRIPTION OF EMBODIMENTS

Overview

Figure 1:
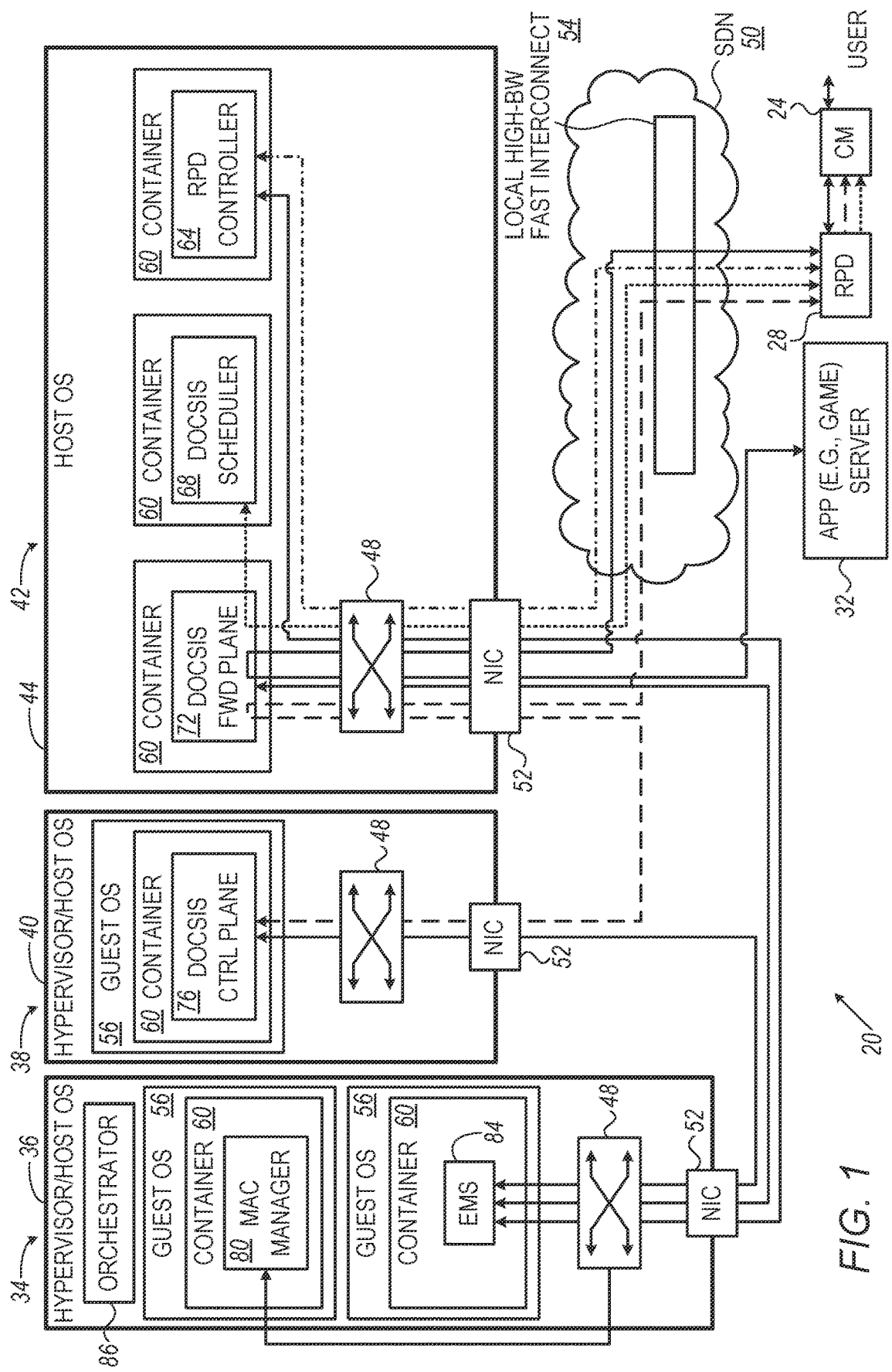
FIG. 1 is a block diagram that schematically illustrates a cable communication system implemented using Virtual Network Functions (VNFs), in accordance with an embodiment of the present invention.

Embodiments of the present invention that are described herein provide improved cable communication systems and associated methods. In the disclosed embodiments, the network side of a cable communication system comprises a plurality of Remote PHY Devices (RPDs) that communicate with user-side cable modems (CMs), and one or more hosts that carry out the Medium Access Control (MAC) layer and higher layer functionalities. The hosts may comprise physical hosts and/or virtual hosts. In one implementation, the entire MAC layer is implemented in the cloud.

In some embodiments, the MAC layer functionality is partitioned into a set of software modules referred to as Virtual Network Functions (VNFs). Each VNF may be implemented, for example, in an application container. In an example embodiment, the entire MAC layer functionality is carried out by a set of VNFs implemented in Docker containers that are orchestrated by orchestration software such as Kubernetes.

In various embodiments, the MAC layer functionality may be partitioned into VNFs, and placed on the various hosts, in various ways and in accordance with various criteria. Typically, the partitioning into VNFs aims to define each VNF with few and simple interfaces and a self-contained functionality. The partitioning typically also aims to minimize the dependencies among VNFs, and in particular time-sensitive dependencies. Another consideration in partitioning is the ability to offload tasks to accelerators such as "Smart-NICs".

A major consideration in the assignment of VNFs to hosts is the network latency to/from the user-side CMs. For example, VNFs that carry out latency-sensitive data-plane functions will typically be placed on hosts having small latencies to/from the CMs. VNFs that carry out control-plane functions, on the other hand, may be placed on hosts having higher latencies. In some embodiments, the VNFs are partitioned into data-plane VNFs and control-plane VNFs, and assigned to the hosts according to latency requirements.

In some embodiments the control-plane VNFs are subdivided into fast-control-plane VNFs and slow-control-plane VNFs, and placed accordingly on the hosts. In an example embodiment, fast-control-plane VNFs may perform functions such as upstream (US) scheduling of transmissions from the CMs to the RPDs. Slow-control-plane VNF may perform functions such as configuration of CMs and of network-side and user-side Radio-Frequency (RF) elements and allocation of channel resources to cable modems and to the RPDs. In some embodiments, downstream (DS) scheduling of transmissions from the MAC to the CMs is performed by the data-plane VNFs.

Several examples of implementing a DOCSIS system, including partitioning and placement of VNFs, are described below. The implementation of MAC functions using VNFs provide significant benefits. For example, MAC functions can be flexibly assigned to various types of hosts, and moved from one host to another, largely independently of the hosts' underlying physical structure, hardware and software requirements, performance characteristics and location in the network. Embodiments relating to migration of VNFs from one host to another, and to the use of redundant VNFs for backup and for supporting varying capacity, are also described.

The disclosed techniques thus provide a highly flexible, scalable and cost-effective solution for implementing the network side of cable communication networks, in comparison with architectures such as iCMTS and vCMTS.

System Description

FIG. 1 is a block diagram that schematically illustrates a cable communication system 20 implemented using Virtual Network Functions (VNFs), in accordance with an embodiment of the present invention. The embodiments described herein refer mainly to DOCSIS, but the disclosed techniques are applicable to various other communication standards and protocols, e.g., LTE.

System 20 comprises multiple Cable Modems (CMs) 24 that provide cable communication services to users. CMs 24 communicate with Remote PHY devices (RPDs) 28. The figure shows a single CM 24 and a single RPD 28, for the sake of clarity. Real-life systems typically comprise a large number of CMs and RPDs. System 20 may provide any suitable communication service to users, for example cable television service and other applications such as gaming. A game server 32 is depicted as an example of an application "app" server.

The MAC layer functionality of the network side of system 20 is implemented on one or more hosts. Each host may comprise a physical host (a physical computer) such as a Commercial Off-The-Shelf (COTS) server, or a virtual host such as a virtual server that runs one or more Virtual Machines (VMs). A virtual host is also, in turn, hosted on some physical host, typically a COTS server. For ease of explanation, only the host operating systems (OSs), or hypervisors in the case of a virtual host, are seen in the figure.

In the present embodiment, system 20 is implemented on three hosts—Two cloud-based virtual hosts 34 and 38, and one physical host 42. Virtual host 34 runs a hypervisor 36 that hosts one or more guest OSs 56, each guest OS 56 in turn running one or more containers 60. Virtual host 38 runs a hypervisor 40 that similarly hosts one or more guest OSs 56, each running one or more containers 60. Physical host 42 runs an OS 44, which also runs one or more containers 60.

In an example embodiment, containers 60 are Docker containers that are orchestrated by orchestration software such as Kubernetes, Oracle Cloud Infrastructure (OCI) or Google Anthos. Each container 60 is used for running a Virtual Network Function (VNF) that performs a certain DOCSIS MAC function, as will be explained in detail below.

In the embodiment of FIG. 1, each virtual host or host OS runs a respective virtual switch 48. Each host comprises a respective Network Interface Controller (NIC) 52. NICs 52 may be virtual or physical NICs, depending on whether the host is virtual or physical. Switches 48 and NICs 52 are used for communicating among the various system components. NICs 52 connect the hosts to a communication network 50, which is also connected to RPDs 28 and server 32. In the present example, network 50 is managed as a Software Defined Network (SDN). A portion of network 50 is implemented as a local high-bandwidth interconnect 54.

In some embodiments, the MAC layer functionality of the network side of system 20 is partitioned into a set of software modules referred to as Virtual Network Functions (VNFs). Each VNF runs in a respective container 60 in one of the hosts of system 20. In the example of FIG. 1, the MAC layer comprises the following VNFs:

RPD controller 64—A VNF that controls RPDs 28.
DOCSIS scheduler 68—A VNF that schedules upstream (US) transmissions from CMs 24 to the network.
DOCSIS forwarding plane 72—A VNF that encrypts and decrypts data, performs classification, frames and deframes packets, and fragments and concatenates packets.
DOCSIS control plane 76—A VNF that manages and maintains CM connections, and adjusts physical parameters of the RF network.
MAC manager 80—A VNF that represents a single point of contact for operator back-office management systems to access network elements within its scope of control, and manage Remote MAC Devices (RMDs), virtual and physical CCAP Cores, PON entities, etc.
Element Management System (EMS) 84—A VNF that serves as a front-end or "façade" for controlling VNFs from an external management system (e.g., OSS/BSS). EMS is specified, for example, in ETSI Group Specification NFV-MAN 001, entitled "Network Functions Virtualisation (NFV); Management and Orchestration,"

version 1.1.1, section 5.6.4, December, 2014, which is incorporated herein by reference. Typically, EMS 84 performs translation to and from a set of primitives such as the MAC Manager Interface (MMI), which is specified in "Data-Over-Cable Service Interface Specifications; Flexible MAC Architecture-Flexible MAC Architecture MAC Manager Interface Specification," CM-SP-FMA-MMI-I01-200930, Sep. 30, 2020, which is incorporated herein by reference. In an embodiment, EMS 84 functions as an endpoint of this protocol.

In some embodiments, the VNFs of system 20 may be implemented using Linux extreme data path (XDP). When using XDP, assuming the NIC driver of the host in question supports this feature, VNFs can be implemented in a container with high packet processing efficiency.

In various embodiments, a given container 60 may comprise a single MAC function or multiple interrelated MAC functions. In an embodiment, MAC functions that operate on the same stream of data packets, and that require fast communication, may be placed in a single container 60 but organized into pipelines.

Partitioning into VNFs and Placement of VNFs on Hosts

In various embodiments, the MAC layer functionality of the network side of system 20 can be decomposed into VNFs, and placed on the various hosts, in various ways. In the architecture seen in FIG. 1, system 20 further comprises an orchestration VNF 86, also referred to as "orchestrator", which orchestrates and manages the various VNFs. Orchestrator 86 typically performs tasks such as spawning and termination of VNFs, placement (assignment of MAC functions—implemented as VNFs—to hosts), migration of VNFs between hosts, and the like. Orchestrator 86 may be implemented, for example, using Kubernetes or using a suitable cloud manager such as Google Kubernetes Engine (GKE) or Amazon Elastic Container Service (ECS). Alternatively, the orchestrator may be implemented using proprietary software, e.g., as a plugin for Kubernetes. In some embodiments the placement is static. In other embodiments, placement decisions may change over time depending on various factors.

Some of the partitioning criteria typically have to do with proper modularization, i.e., defining each VNF with few and simple interfaces and a self-contained functionality, and minimizing dependencies among VNFs. The partitioning criteria may also depend on the ability to offload tasks to accelerators such as "Smart-NICs". The placement criteria typically depend on the network latency between the VNF and the user-side CMs. For example, VNFs that carry out latency-sensitive data-plane functions will typically be placed on hosts having small latencies to/from the CMs. VNFs that carry out control-plane functions, on the other hand, may be placed on hosts having higher latencies.

In the embodiment of FIG. 1, for example, host 42 is located "close to the user", i.e., is characterized by very small latency to/from CMs 24. In some cases, although not necessarily, this latency corresponds to a small physical distance between host 42 and CMs 24, e.g., a distance on the order of 1 Km. App server 32 is typically also characterized by a similarly small latency (and possibly physical distance) to/from CMs 24. Host 38, in contrast, has a higher latency to/from CMs 24. This higher latency may correspond to a larger physical distance to/from CMs 24, e.g., a distance on the order of 20 Km. Host 34 is located even further away from CMs 24.

In some embodiments, the VNFs that carry out the various MAC functions are placed on the various hosts depending on the latencies ("distance from the users") that characterize the hosts. In the present example, RPD controller 64, DOCSIS scheduler 68 and DOCSIS forwarding plane 72, which are highly sensitive to latency, have been placed on host 42. DOCSIS control plane 76, which is more tolerant to latency, has been placed on host 38. MAC manager 80 and EMS 84, which are the most latency-tolerant functions in the system, have been placed on host 34.

Figure 2:
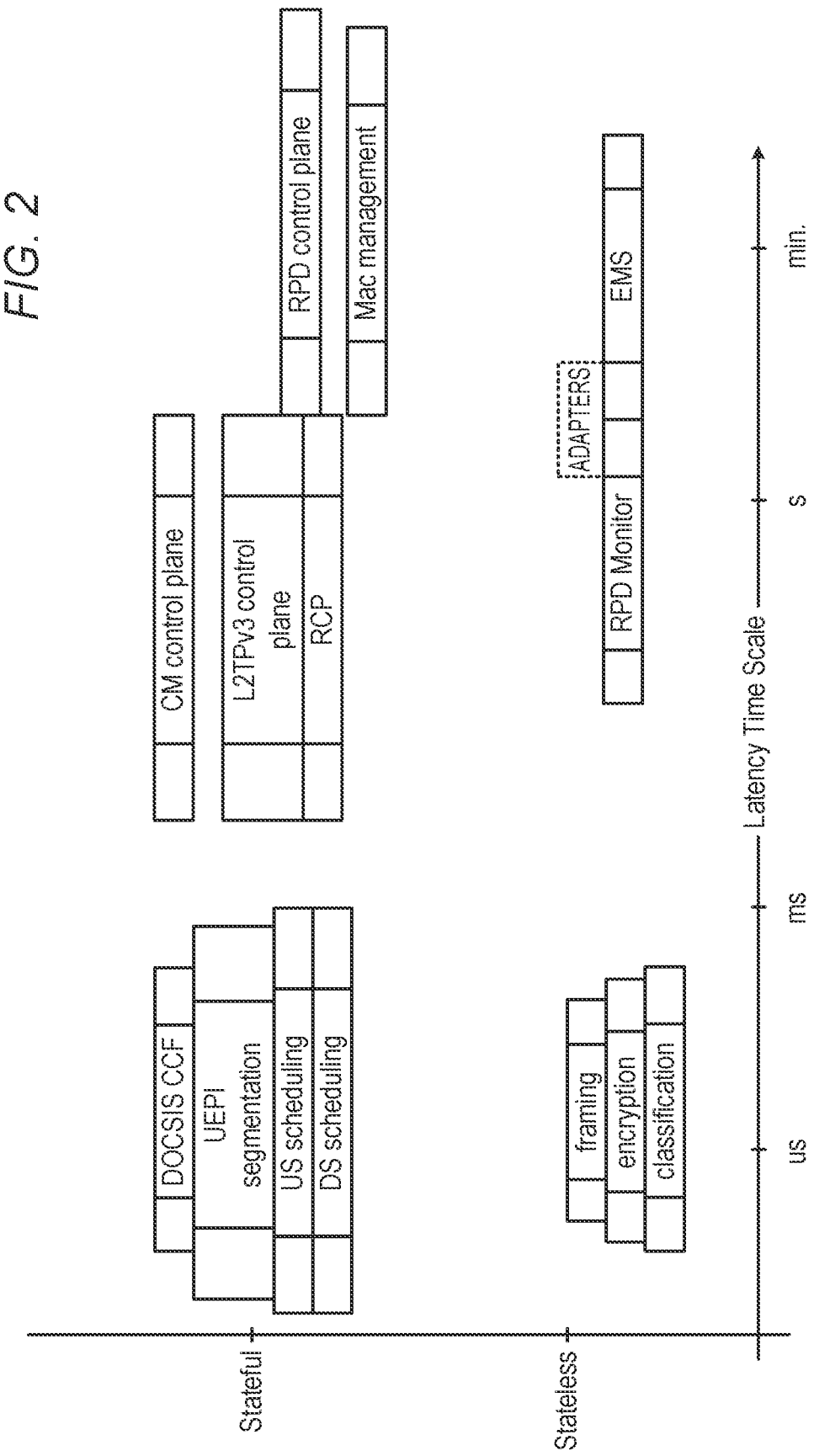
FIG. 2 is a graph showing a schematic classification of MAC functions in terms of latency and statelessness vs. statefullness (and thus complexity of offloading), in accordance with an embodiment of the present invention.

FIG. 2 is a graph showing a schematic classification of MAC functions in terms of latency and state, in accordance with an embodiment of the present invention. In the present example, the MAC functionality is decomposed into the following set of MAC functions:

MAC management—A function that configures and monitors the control plane and network elements.

RPD Monitor—A function that tracks the states of RPDs 28 and other network data for further processing and visualization.

EMS—as noted above—a "façade" function for vCore/CMTS functionality distributed over subcomponents.

RPD control plane—A function that maintains RPDs 28 and their configurations.

L2TPv3 control plane—A function that maintains Layer-2 Tunneling Protocol v3 (L2TPv3) connections used for encapsulation of data-plane traffic.

RCP—Strictly speaking a protocol, not a function, that operates over the DOCSIS Generic Control Protocol (GCP) over TCP connections used by the RPD controller to configure RPDs 28.

CM control plane—A function that maintains the configurations and transmission parameters of CMs 24.

DS scheduling—A function that allocates DS packets/data to Radio Frequency (RF) channels according to Quality of Service (QoS).

US scheduling—A function that grants US time and frequency windows to CMs 24, enabling the CMs to transmit US data through the common channel without collisions, according to QoS.

Encryption—A function that encrypts and decrypts packet data.

Classification—A function that classifies packets for maintaining QoS.

Framing—A function that performs protocol encapsulation, maintains sequence numbers and the like, for protocols such as Ethernet, Internet Protocol (IP), Downstream External PHY Interface (DEPI), Upstream External PHY Interface (UEPI) and DOCSIS.

UEPI segmentation—A function (for use by RPDs 28) that combines multiple DOCSIS packets into a UEPI frame, and/or splits a packet into multiple UEPI packets.

DOCSIS CCF—A function (for use by CMs 24) that combines multiple data packets into one DOCSIS segment, or splits a packet and sends it in multiple DOCSIS segments.

The slow and fast DOCSIS control plane functions (e.g., US scheduling), DOCSIS forwarding plane (e.g., encryption, DOCSIS CCF, classification, framing) and CM control plane functions are specified, for example, in "Data-Over-Cable Service Interface Specifications—DOCSIS® 4.0—MAC and Upper Layer Protocols Interface Specification," CM-SP-MULPIv4.0-I03-201202, Dec. 2, 2020, which is incorporated herein by reference. The RPD control plane, RPD monitor and encryption functions, and RCP, are specified, for example, in "Data-Over-Cable Service Interface Specifications—MHAv2—Remote PHY Specification," CM-SP-R-PHY-I15-201207, Dec. 7, 2020, which is incorporated herein by reference.

The L2TPv3 control plane function is specified, for example, in "Data-Over-Cable Service Interface Specifications—MHAv2—Remote Downstream External PHY Interface Specification," CM-SP-R-DEPI-I15-201207, Dec. 7, 2020, which is incorporated herein by reference. The L2TPv3 control plane and UEPI segmentation and reassembly functions are specified, for example, in "Data-Over-Cable Service Interface Specifications—MHAv2—Remote Upstream External PHY Interface Specification," CM-SP-R-UEPI-I13-201207, Dec. 7, 2020, which is incorporated herein by reference. The RPD control plane function is specified, for example, in "Data-Over-Cable Service Interface Specifications—DCA-MHAv2—Remote PHY Specification, CM-SP-R-PHY-I15-201207, Dec. 7, 2020, which is incorporated herein by reference.

As seen with reference to the horizontal axis of FIG. 2, MAC functions relating to the data-path or data-plane (e.g., framing, encryption, segment reassembly, US and DS scheduling) are time-sensitive and should be handled with latencies on the order of microseconds. At the other extreme, control-plane MAC functions such as EMS, MAC management and RPD control-plane are much more tolerant to latency, and can be handled with latencies on the order of minutes. Other MAC functions require response time of milliseconds or seconds, as appropriate.

The vertical axis of the figure indicates the extent to which each MAC function is stateless vs. stateful. This metric is important, for example because stateless functions are relatively simple to offload to an accelerator. Stateful functions are more complex to offload, although possible. One example type of accelerator is a high-functionality NIC, sometimes referred to as "Smart-NIC", having on-board CPUs and/or dedicated processing hardware. Alternatively, any other suitable types of accelerators can be used.

As seen in the figure, functions such as classification, encryption and framing are particularly good candidates for offloading to an accelerator, because they are both latency-sensitive and stateless. An implementation that offloads these functions is addressed in FIG. 3 below.

Figure 3:
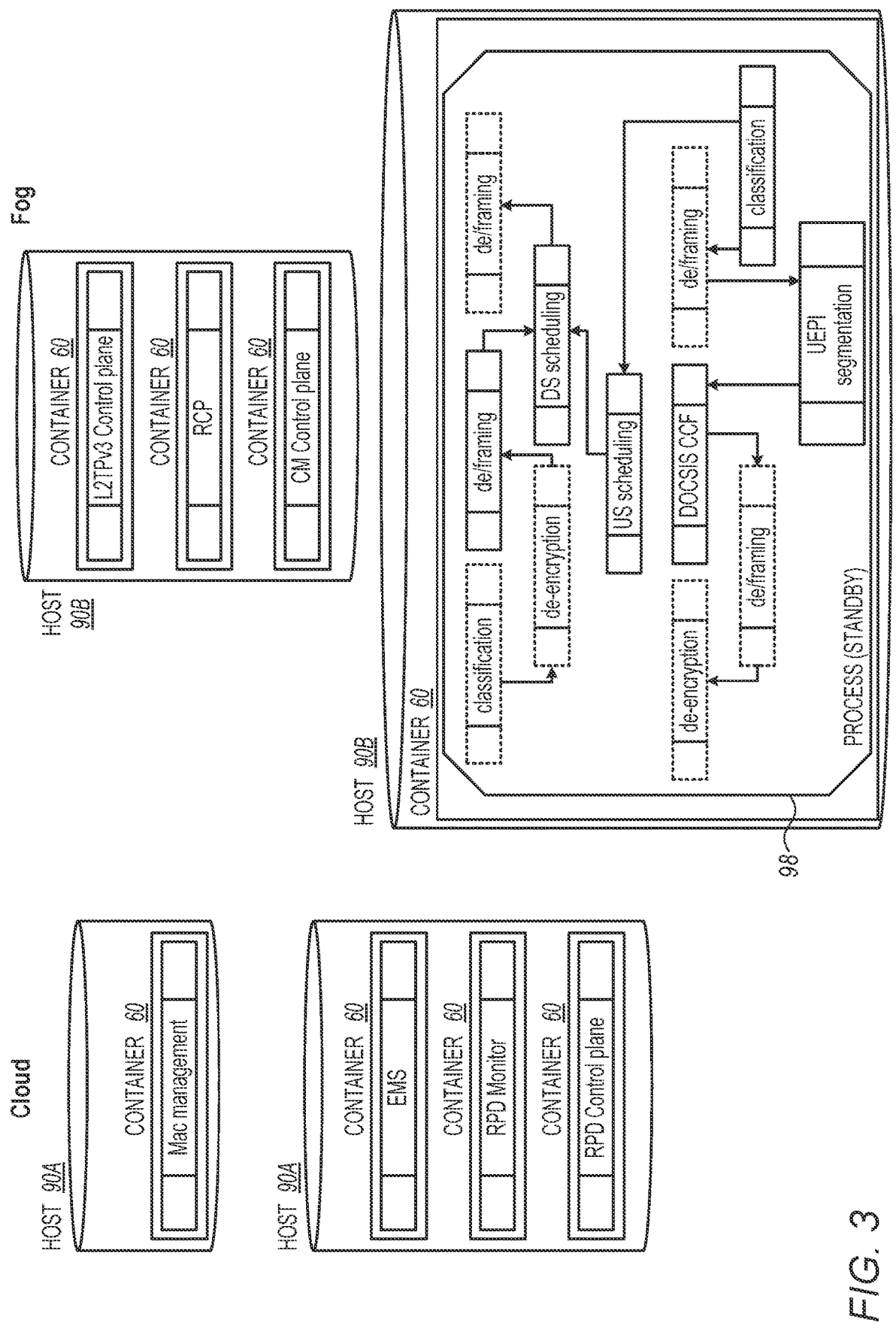
FIG. 3 is a diagram that schematically illustrates placement of VNFs in a cable communication system, in accordance with another embodiment of the present invention.
Figure 3:
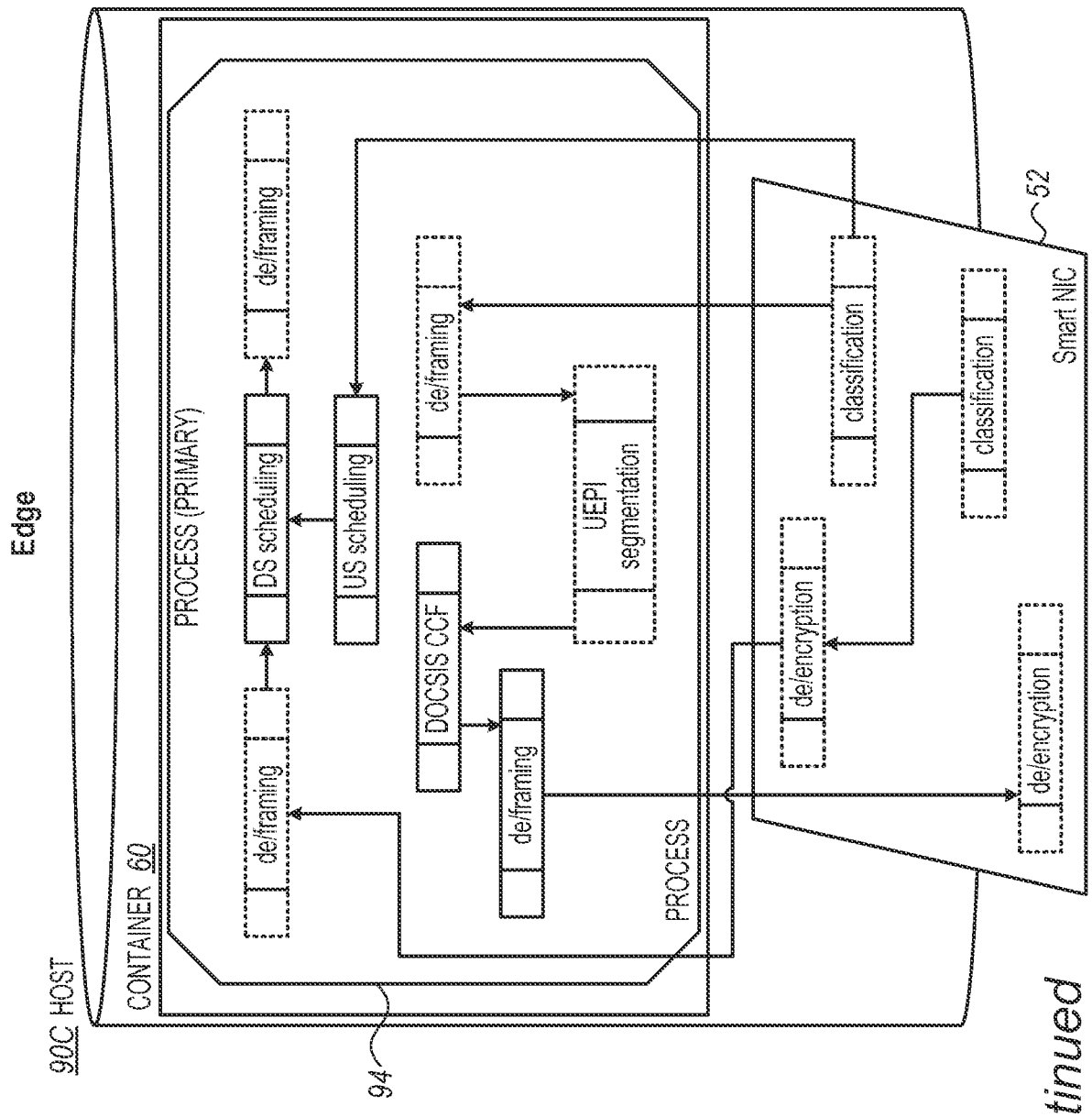

FIG. 3 is a diagram that schematically illustrates placement of VNFs in a cable communication system, in accordance with another embodiment of the present invention. FIG. 3 is used for demonstrating several features of the disclosed techniques, namely (i) placement of VNFs on hosts depending on latency tolerance, (ii) offloading of VNFs to a "Smart-NIC", and (iii) use of primary and backup VNFs and switching between them.

In the example of FIG. 3, the hosts are divided into three domains: A "cloud" domain, comprising hosts 90A, is the most distant from CMs 24 and may be characterized by response time on the order of up to several seconds to/from the CMs. A "fog" domain, comprising hosts 90B, is characterized by intermediate latencies, e.g., on the order of seconds to/from the CMs. An "edge" domain, comprising hosts 90C, is closest to CMs 24 and is typically characterized by latencies on the order of milliseconds to/from the CMs.

Each of hosts 90A, 90B and 90C hosts one or more containers 60 that run respective VNFs that perform MAC functions. The assignment ("placement") of VNFs to hosts follows the general guidelines described above, i.e., data-plane VNFs are assigned to "edge" hosts 90C, and control-plane VNFs are assigned to "fog" and "cloud" hosts 90B and 90A. In some embodiments, the control-plane VNFs are sub-divided into slow-control-plane VNFs (which are assigned to "cloud" hosts 90A) and fast-control-plane VNFs (which are assigned to "fog" hosts 90B). In practice, the placement need not follow these guidelines perfectly—Deviations from the guidelines are sometime needed and tolerated for various reasons.

In the present example, an "edge" host 90C runs a process 94 that carries out classification, de/encryption, de/framing, UEPI segmentation, US scheduling and DS scheduling, and DOCSIS CCF functions. In addition, one of "fog" hosts 90B runs a process 98, which is similar in functionality to process 94. Process 94 is referred to as "primary", and is used by default. Process 98 is referred to as "standby", and is used as a backup when primary process 94 is unavailable.

By default, standby process 98 is inactive, thereby saving resources such as memory and power consumption. If for some reason "edge" host 90C is unable to run primary process 94, orchestrator 86 invokes secondary process 98 in the "fog" domain.

In "edge" host 90C, some of the functions of process 94, namely classification and de/encryption, are offloaded and carried out by a Smart-NIC 52. The other functions of process 94 are carried out by the host itself, in software. In "fog" host 90B, the entire process 98 is carried out in software by the host. The performance of process 98 is typically inferior to that of process 94 (both because of the difference in offloading, and because of the performance difference between the "fog" and "edge" domains). Nevertheless, since process 98 is invoked only as backup under special circumstances, this level of performance is acceptable.

In some embodiments, "edge" hosts 90C run multiple instances of process 94, and "fog" hosts 90B run multiple instances of process 98. Each instance is configured to serve a respective session with a certain CM 24. If the number of concurrent sessions is sufficiently small, then all sessions are served by the "edge" hosts, i.e., by instances of primary process 94. If the number of concurrent sessions becomes too large to be served by the "edge" hosts, orchestrator 86 invokes one or more instances of standby process 98 on "fog" hosts 90B to meet the demand. If the number of sessions decreases, orchestrator 86 may deactivate instances of backup process 98 as needed. This mechanism is highly effective in meeting varying demands for MAC functions, while at the same time providing High Availability (HA) and optimizing host resources such as memory space, computational resources and power consumption.

Additionally or alternatively, in some embodiments orchestrator 86 migrates a certain VNF from one physical host to another. Migration may be performed in real-time, e.g., while the VNF is serving an on-going session. Migration may be triggered by various events, for example due to insufficient resources on a given host to support the VNF, or due to failure or planned shut-down of a host. Migration may be performed between hosts of the same domain ("edge", "fog" or "cloud") or between hosts of different domains.

The system and host configurations shown in FIGS. 1 and 3 are example configurations that are chosen purely for the sake of conceptual clarity. In alternative embodiments, any other suitable system or host configurations can be used. The example decompositions of MAC functions into VNFs, and the example assignments of VNFs to hosts, are also depicted purely for the sake of clarity. In alternative embodiments, any other suitable decomposition and/or placement can be used.

The different system and host elements may be implemented using software, using suitable hardware, such as in one or more Application-Specific Integrated Circuits (ASICs) or Field-Programmable Gate Arrays (FPGAs), or using a combination of software and hardware elements. In some embodiments, some or all of the functions of any of the system and host elements described herein can be implemented using one or more general-purpose processors, which are programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A cable communication system, comprising:
one or more data-plane virtual network functions (VNFs), which are configured to run on one or more hosts in a data network, and to perform data-plane medium access control (MAC) processing for a plurality of user-side cable modems and for a plurality of network-side physical-layer (PHY) devices that communicate with the user-side modems; and
one or more control-plane VNFs, which are configured to run on at least one host in the data network, separately from the data-plane VNFs, and to perform control-plane processing for the user-side modems and the network-side PHY devices.

2. The system according to claim 1, wherein the data-plane VNFs are configured to run on one or more hosts having a first range of network latency via the data network from the user-side cable modems, and wherein the control-plane VNFs are configured to run on at least one host having a second range of network latency via the data network, larger than the first range, from the user-side cable modems.

3. The system according to claim 1, wherein the control-plane VNFs comprise:
at least one fast-control-plane VNF, configured to schedule upstream transmissions from the user-side cable modems to the network-side PHY devices; and
at least one slow-control-plane VNF, configured to configure (i) the user-side cable modems and (ii) network-side and user-side Radio-Frequency (RF) elements.

4. The system according to claim 3, wherein the fast-control-plane VNFs are configured to run on one or more first hosts, wherein the slow-control-plane VNFs are configured to run on one or more second hosts, such that the first hosts have a smaller network latency from the user-side cable modems, in comparison with the second hosts.

5. The system according to claim 3, wherein the data-plane VNFs are configured to schedule downstream transmissions to the user-side cable modems.

6. The system according to claim 1, wherein at least a given host, which runs at least a given VNF among the data-plane VNFs and the control-plane VNFs, comprises an accelerator configured to offload at least part of the given VNF from a CPU of the given host.

7. The system according to claim 1, further comprising at least one orchestration VNF, which is configured to control operation of the data-plane VNFs and the control-plane VNFs.

8. The system according to claim 7, wherein the orchestration VNF is configured to migrate a given VNF from a first physical host to a second physical host.

9. The system according to claim 1, wherein the data-plane VNFs and the control-plane VNFs are implemented as application containers.

10. A method for cable communication, comprising:
performing data-plane medium access control (MAC) processing, for a plurality of user-side cable modems and for a plurality of network-side physical-layer (PHY) devices that communicate with the user-side modems, by running one or more data-plane virtual network functions (VNFs) on one or more hosts in a data network; and
performing control-plane processing for the user-side modems and the network-side PHY devices, by running one or more control-plane VNFs on at least one host in the data network, separately from the data-plane VNFs.

11. The method according to claim 10, wherein performing the data-plane MAC processing comprises running the data-plane VNFs on one or more hosts having a first range of network latency via the data network from the user-side cable modems, and wherein performing the control-plane MAC processing comprises running the control-plane VNFs on at least one host having a second range of network latency via the data network, larger than the first range, from the user-side cable modems.

12. The method according to claim 10, wherein the control-plane VNFs comprise:
at least one fast-control-plane VNF, for scheduling upstream transmissions from the user-side cable modems to the network-side PHY devices; and
at least one slow-control-plane VNF, for configuring (i) the user-side cable modems and (ii) network-side and user-side Radio-Frequency (RF) elements.

13. The method according to claim 12, wherein performing the control-plane processing comprises running the fast-control-plane VNFs on one or more first hosts, and running the slow-control-plane VNFs on one or more second hosts, such that the first hosts have a smaller network latency from the user-side cable modems, in comparison with the second hosts.

14. The method according to claim 12, wherein running the data-plane VNFs comprises scheduling downstream transmissions to the user-side cable modems.

15. The method according to claim 10, and comprising offloading at least part of a given VNF, among the data-plane VNFs and the control-plane VNFs, from a CPU of a given host to an accelerator.

16. The method according to claim 10, further comprising controlling operation of the data-plane VNFs and the control-plane VNFs, by running at least one orchestration VNF.

17. The method according to claim 16, wherein controlling the operation of the data-plane VNFs and the control-plane VNFs comprises migrating a given VNF from a first physical host to a second physical host.

18. The method according to claim 10, wherein the data-plane VNFs and the control-plane VNFs are implemented as application containers.

\* \* \* \* \*